(12) United States Patent
Schaffer

(10) Patent No.: US 6,411,949 B1
(45) Date of Patent: Jun. 25, 2002

(54) CUSTOMIZING DATABASE INFORMATION FOR PRESENTATION WITH MEDIA SELECTIONS

(75) Inventor: J. David Schaffer, Wappingers Falls, NY (US)

(73) Assignee: Koninklijke Philips Electronics N.V.,, Eindhoven (NL)

( * ) Notice: Subject to any disclaimer, the term of this patent is extended or adjusted under 35 U.S.C. 154(b) by 0 days.

(21) Appl. No.: 09/372,959

(22) Filed: Aug. 12, 1999

(51) Int. Cl.[7] .............................................. G06F 17/30
(52) U.S. Cl. ............................ 707/2; 707/514; 345/723
(58) Field of Search ............................. 705/10, 14, 26; 345/333, 307, 228, 335, 762, 723, 744; 707/2, 514, 500.1

(56) References Cited

U.S. PATENT DOCUMENTS

| | | | | |
|---|---|---|---|---|
| 5,787,417 A | * | 7/1998 | Hargrove ........................ | 707/4 |
| 6,014,638 A | * | 1/2000 | Burge et al. ................... | 705/27 |
| 6,044,376 A | * | 3/2000 | Kurtzman, II .............. | 707/102 |
| 6,122,011 A | | 9/2000 | Dias et al. ................... | 348/569 |
| 6,154,213 A | * | 11/2000 | Rennison et al. ........... | 345/353 |
| 6,177,934 B1 | | 1/2001 | Alexander et al. .......... | 345/327 |

FOREIGN PATENT DOCUMENTS

| | | | | |
|---|---|---|---|---|
| WO | WO974924 | 12/1997 | ............ | H04N/7/10 |
| WO | WO9904561 | 1/1999 | .......... | H04N/5/445 |

OTHER PUBLICATIONS

Michael Ehrmantraut, Theo Harder, Hartmut Wittig, Ralf Steinmetz, "The Personal Electronic Program Guide–Towards the Pre–selection of Individual TV Programs", ACM, Inc. 1996, p.243–250 .*

* cited by examiner

Primary Examiner—John Breene
Assistant Examiner—Susan Rayyan
(74) Attorney, Agent, or Firm—Edward W. Goodman

(57) ABSTRACT

Enhanced content data is supplied in association with a media selection. The enhanced content data is customized responsive to a user profile. The uncustomized enhanced content is stored as a data structure having levels of nodes. Each node within a given level represents an alternative version of a shared enhanced content sub-topic. A processor chooses between nodes within the levels and assembles the chosen nodes to produce the customized enhanced content data.

12 Claims, 3 Drawing Sheets

1296 PATHS THROUGH THIS NETWORK (3x2x3x2)

MEANS NO ELEMENT USED AT THIS LEVEL

CUSTOMIZING DATABASE INFORMATION FOR PRESENTATION WITH MEDIA SELECTIONS

BACKGROUND OF THE INVENTION

1. Field of the Invention

The invention relates to the field of customizing information for presentation with a media selection.

2. Description Of The Related Art

International Patent Application No. WO 99/04561, corresponding to U.S. Pat. Nos. 6,122,011 and 6,177,931, discloses a system and method for customizing certain information for association with a media selection, especially for choosing media selections and advertising information. The term "media selection" as used herein means an audio recording, a video recording, a multimedia item, a representation of a program in an electronic program guide, or any other recorded or transmitted data which may be presented to a user.

It is a shortcoming of the known system and method that information is insufficiently customized.

SUMMARY OF THE INVENTION

It is an object of the invention to provide additional information relating to a media selection.

This object is achieved through use of a user profile and enhanced content data. A processor combines and supplies enhanced content data with the media selection responsive to the user profile.

It is a further objection of the invention to customize information more finely relating to the media selection.

This object is achieved in that enhanced content data is embodied in a plurality of data structures stored on at least one storage device. At least one of the data structures has a plurality of nodes. Each node includes a respective piece of candidate enhanced content. At least first and second ones of the nodes in a single data structure represent alternative versions of a shared enhanced content topic. A processor chooses between the first and second ones of the nodes responsive to a list of user features in a user profile.

BRIEF DESCRIPTION OF THE DRAWINGS

The invention will now be described by way of non-limiting example with respect to the accompanying drawings, in which.

DESCRIPTION OF THE PREFERRED EMBODIMENTS

Figure 1:
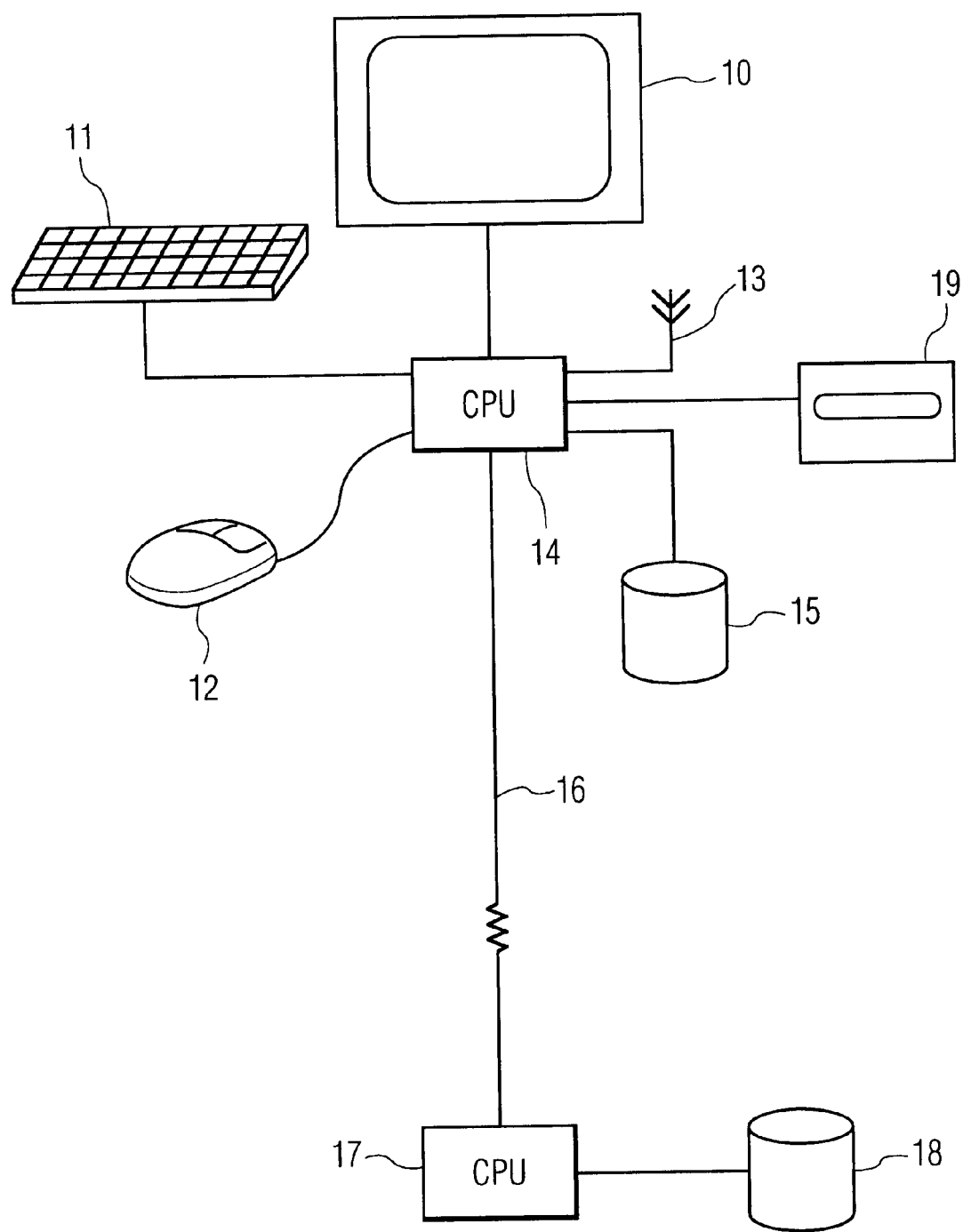
FIG. 1 shows a system configurable in accordance with the invention.

FIG. 1 shows a system configurable in accordance with the invention. A display device is shown at 10. The display device may be the screen of a television set, a computer monitor, or any other display device. The display device 10 is coupled to a processor 14 which may be an on-board processor in a television set or PC, a separate processor, a set top box, a LAN server, a mainframe, or any other suitable processor. Data entry devices, such as a keyboard 11, or a mouse 12, are envisioned. These are shown coupled with the processor 14; however, if the processor 14 is a LAN server or mainframe, the data entry devices might equally well be coupled with the display device, which might have a further local processor. The processor may receive data from a local memory 15, 19, an antenna 13, a network connection 16, or any other data source device. The local memory 15 may be a hard disk drive or other rewritable medium, or any other storage device. The local memory 19 may be a floppy or CD-ROM drive or any other storage device. The network connection 16 may be from a cable provider, an Internet service provider, a LAN, or any other network. Commonly at the other end of the network connection 16, there will be some type of processor 17, such as a server, coupled with a memory 18 which may be local or may be accessible via a further network connection.

The term "storage device" as used herein includes any type of memory, including those structured with an access device and a medium. The term "source device" includes storage devices, antennae, and network connections.

Preferably, the local memory 15 contains an embodiment of a user profile, though the user profile might also be stored at device 18 or 19. The user profile may be assembled in accordance with the teachings of WO 99/04561, or according to any other known technique for assembling user profiles. Alternatively, the user profile might be established in response to a questionnaire administered to the user. Once assembled, the user profile should comprise a list of user features and sub-features. For instance, a user profile might have a numerical representation indicating that the user is a rock fan, with the sub-feature that the user is a particularly heavy fan of the band U2. The numerical representation might include an intensity scale such as:

| NUMBER | DESCRIPTION |
|---|---|
| 1 | HATES RABIDLY |
| 2 | HATES |
| 3 | DISLIKES |
| 4 | MODERATELY NEGATIVE |
| 5 | NEUTRAL |
| 6 | MODERATELY POSITIVE |
| 7 | LIKES |
| 8 | LOVES |
| 9 | LOVES PASSIONATELY |
| 10 | LOVES RABIDLY |

The invention seeks to enhance the enjoyment of a user accessing a media selection, by providing customized enhanced content data, associated with the media selection. The enhanced content data could be received in a customized or uncustomized form at the local processor 14. The enhanced content could be stored and/or received with, or separately from, the media selection. The enhanced content data and/or the media selection might to be on a recorded medium, such as an audio cassette or CD (compact disc), a CD-ROM (compact disc—read-only memory), or a DVD (digital video disk). The enhanced content and/or the media selection might also be transmitted to the user via the antenna 13 or network connection 16.

The enhanced content data may comprise audio, video, textual, or multimedia information. The enhanced content data will typically relate to some aspect of the media selection. For instance, biographical information about a composer might be enhanced content data for a musical recording. Another example might be that, if the performers are associated with a particular geographical area, the enhanced content data might relate to current or historical events in that area. Those of ordinary skill in the art might devise any number of different types of content data. Enhanced content data is not advertising for goods or services.

Figure 2:
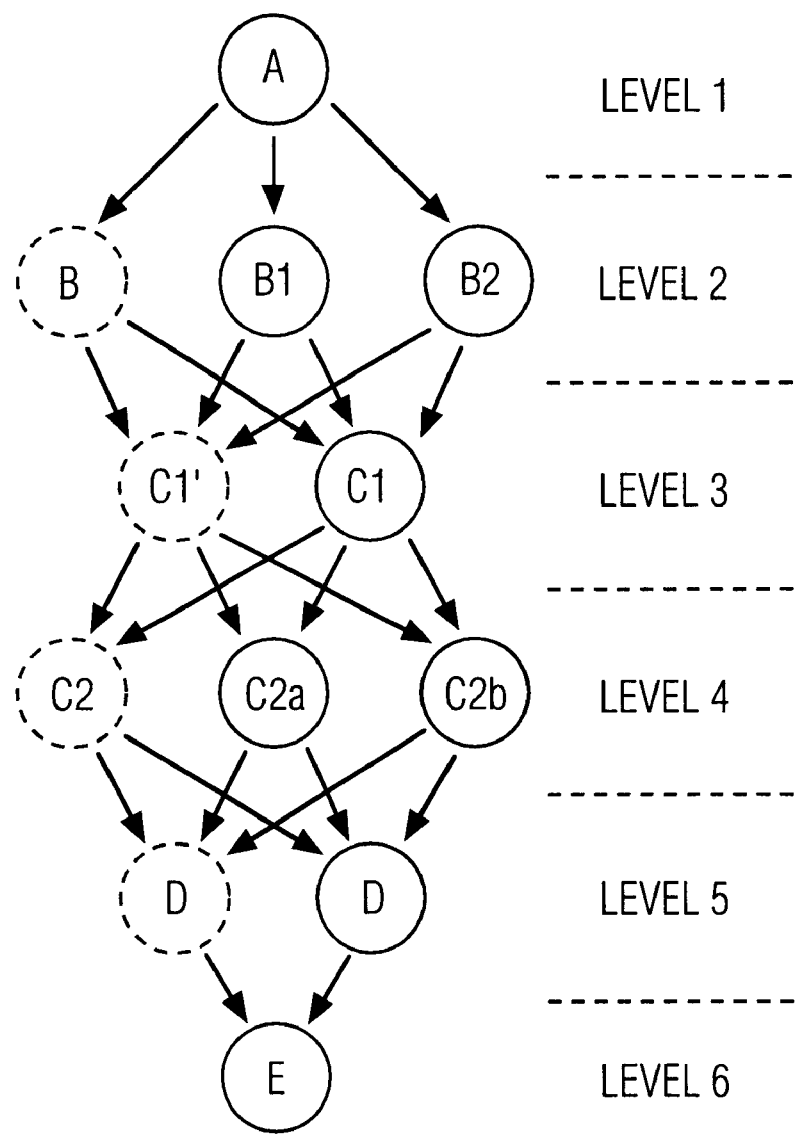
FIG. 2 shows a data structure for use in the invention.
Figure 2:
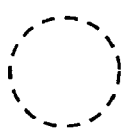

Uncustomized enhanced content data is to be customized in accordance with the user profile. For this purpose, the uncustomized enhanced content data is preferably presented and/or stored in the form of a graph-like data structure. FIG. 2 shows such a data structure. This data structure may be stored locally at device 15 or 19 or centrally at device 18. The illustrated data structure has six levels, though those of ordinary skill in the art might readily devise a data structure having more or fewer levels. Level 1 contains node A, including enhanced content data to be presented to all users. Level two contains three alternative enhanced content data alternatives, B, B1, B2 relating to a subtopic flowing from the content of node A. Dotted nodes, like B, C1', C2, and D', represent the option of not presenting any data relating to the subtopic associated with that particular level. Level three contains two nodes, C1' and C1. Level four contains three nodes, C2, C2a, and C2b. The total data structure is a graph, of the type commonly referred to as a network, having 36 possible paths through it. Each path represents a distinct customization of the enhanced content data.

The following is an illustrative example of how the data structure of FIG. 2 might be used to customize enhanced content data for presentation to the user: The content data in question is assumed to be relating to a new song by the Irish rock group U2.

A: A generic opening segment Rule: always show
B. Level skipping node Rule: use if B1 or B2 not shown
B1. A segment on the personalities of the band members, tagged to those with high interest in rock music, but not heavy fans of U2 Rule: do not show if B2 shown
B2. A segment on recent news of the band members, tagged to rabid U2 fans Rule: show only to tagged users
C1'. Level skipping node Rule: use if C1 not shown
C1. A segment on recent events referenced in the song, tagged to those with interest in politics and things Irish Rule: show only to untagged users
C2'. Level skipping segment Rule: use if C2a and C2b not shown
C2a. A segment on the ancient history references in the song, prepared assuming no prior knowledge of these events, tagged to those with mild curiosity about Ireland and/or history.
Rule: show only to tagged users and if C2b not shown
C2b A segment on the ancient history references in the song, prepared assuming some prior knowledge of these events, tagged to those with a stronger interest in Ireland and/or history Rule: show only to tagged users
D': Level skipping segment Rule: use only if D not used
D. A segment on the band's musical style, tagged to those with interest in music techniques or who are musicians Rule: show only to tagged users
E. Closing segment Rule: always show Thus, a number of variations of the customized enhanced content data could be expected, e.g.:
A-E shown if no user information is available or none of the relevant tags are found
A-B1-E shown to basic rock fans
A-B1-C1-E for basic rock fans with some political/Irish interest
A-B2-C1-E for U2 fans with some political/Irish interest
A-B1-C1-C2a-E for basic rock fans with some political/Irish interest and mild interest in Irish history.
A-B2-C1-C2a-E for U2 fans with some political/Irish interest and mild interest in Irish history.

The above is only an example. Any number of segments on any number of different sub-topics might be devised by those of ordinary skill in the art.

Figure 3:
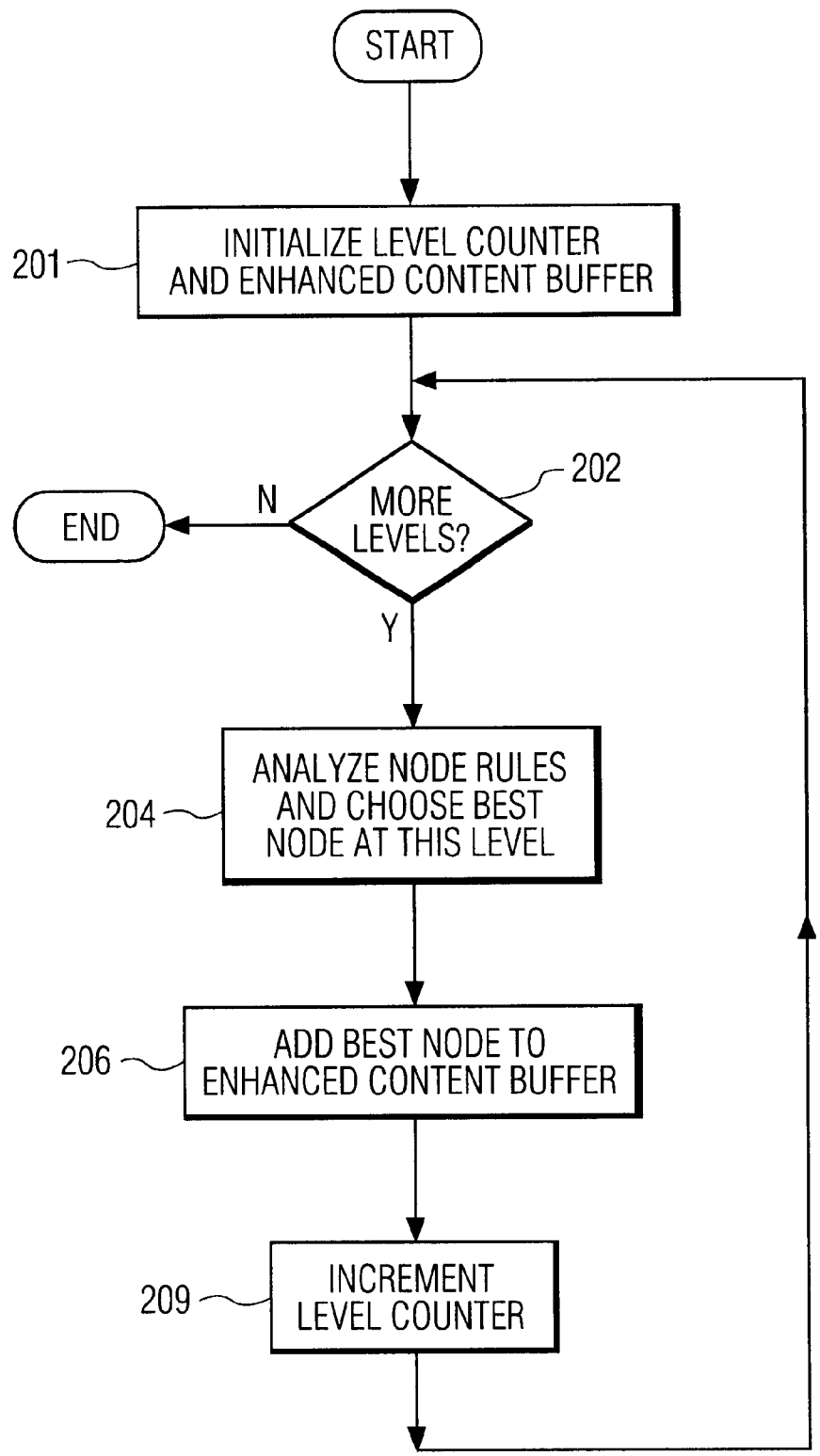
FIG. 3 shows a flowchart for use with the data structure of FIG. 2.

FIG. 3 is a flowchart showing how the data structure of FIG. 2 would be used in creating a customized piece of enhanced data content. The steps of this flowchart would typically be executed locally by processor 14, but could also be executed centrally, e.g., at processor 17. At 201, a level counter and the enhanced content buffers are initialized. If there are more levels at 202, then, at 204, node rules of a current node are analyzed and the best node is chosen. Then, the best node is added, at 206, to the enhanced content buffer. Then, the level counter is incremented, at 209, and control returns to box 202. If, at 202, there are no more levels, then the procedure ends.

While the invention has been described-above with respect to enhanced data content, the specific type of customization contemplated might also be applicable to entire media selections, such as advertisements. In other words, the sub-topics of an advertisement might be chosen in accordance with a user profile. From reading the present disclosure, other modifications will be apparent to persons skilled in the art. Such modifications may involve other features which are already known in the design, manufacture and use of content providing hardware and/or software and which may be used instead of or in addition to features already described herein. Although claims have been formulated in this application to particular combinations of features, it should be understood that the scope of the disclosure of the present application also includes any novel feature or novel combination of features disclosed herein either explicitly or implicitly or any generalization thereof, whether or not it mitigates any or all of the same technical problems as does the present invention. Applicants hereby give notice that new claims may be formulated to such features during the prosecution of the present application or any further application derived therefrom.

The word "comprising", "comprise", or "comprises" as used herein should not be viewed as excluding additional elements. The singular article "a" or "an" as used herein should not be viewed as excluding a plurality of elements.

What is claimed is:

1. A system for enhancing content of a media selection comprising:
   at least one storage device arranged to maintain at least one user profile and enhanced content data related to the media selection; and
   a processing device arranged to combine and supply the enhanced content data with the media selection responsive to the user profile,
   wherein:
   the user profile comprises a list of user features;
   the enhanced content data is embodied in a plurality of data structures stored on the at least one storage device, at least one of the data structures having a plurality of nodes, each node comprising a respective piece of candidate enhanced content, at least first and second ones of the nodes in a single data structure representing alternative versions of a shared enhanced content topic; and
   the processing device chooses between at least the first and second ones of the nodes responsive to the list of user features.

2. The system as claimed in claim 1, wherein the processing device is arranged to supply the enhanced content data such that the enhanced content data comprises a plurality of subtopic content items, each subtopic content item resulting from a respective choice by the processor between nodes in a respective group of nodes, the nodes within each respective group representing alternative versions of a shared enhanced content subtopic.

3. The system as claimed in claim 1, wherein the at least one storage device comprises:
   a rewritable local memory device for maintaining the user profile; and
   a separate memory device for embodying the media selection and the enhanced content data.

4. The system as claimed in claim 1, wherein said system further comprises:
   means for receiving the media selection and enhanced content data.

5. The system as claimed in claim 4, wherein the means for receiving comprises a network connection.

6. The system as claimed in claim 1, wherein the user profile includes a list of user features.

7. The system as claimed in claim 6, wherein the user profile includes values based on an intensity scale and associated with the list of user features.

8. The system as claimed in claim 1, wherein the system is adapted to supply the media selection and content data to the user as a combined media selection.

9. A computer method for enhancing content of a media selection, the method comprising the steps:
   accessing a user profile embodied on a storage device;
   accessing enhanced content data embodied on a storage device and relevant to the media selection, the enhanced content data comprising a plurality of groups of respective content subtopic items, the respective content subtopic items within each group representing alternative versions of a shared enhanced content subtopic;
   choosing at least one appropriate content subtopic item from at least one of the groups, responsive to the user profile;
   assembling an enhanced content package responsive to the choosing; and
   presenting the media selection combined with the enhanced content package to the user.

10. A system for customizing a media selection, said system comprising:
   at least one storage device arranged to maintain at least one user profile, comprising a list of user features, and the media selection embodied in at least one data structure comprising a plurality of nodes, each node comprising a respective piece of candidate enhanced content, at least first and second ones of the nodes in a single data structure representing alternative versions of a shared topic; and
   a processor arranged to choose between at least the first and second ones of the nodes responsive to the list of user features to assemble the media selection.

11. The system as claimed in claim 10, wherein the processor is arranged to supply the media selection such that media selection comprises a plurality of sub-topic content items, each sub-topic content item resulting from a respective choice by the processor between nodes in a respective group of nodes, the nodes within each respective group representing alternative versions of a shared content subtopic.

12. A system for customizing a media selection, said system comprising:
   at least one storage device arranged to maintain an embodiment of at least one user profile, and an embodiment of candidate items for the media selection comprising a plurality of respective groups of sub-topic content items, at least two of the groups comprising a plurality of respective sub-topic content items representing alternative versions of a shared content subtopic corresponding to that group; and
   a processor arranged to choose between sub-topic content items within the at least two groups, responsive to the user profile, and to assemble the media selection from the results of the choice.

* * * * *